M. WILEY.
NUT LOCK.
APPLICATION FILED JAN. 15, 1919.

1,317,058. Patented Sept. 23, 1919.

Witnesses
L. B. James

Inventor
Mark Wiley
By Victor J. Evans
Attorney

UNITED STATES PATENT OFFICE.

MARK WILEY, OF CHICAGO, ILLINOIS.

NUT-LOCK.

1,317,058.  Specification of Letters Patent.  Patented Sept. 23, 1919.

Application filed January 15, 1919. Serial No. 271,311.

*To all whom it may concern:*

Be it known that I, MARK WILEY, a citizen of the United States, residing at Chicago, in the county of Cook and State of Illinois, have invented new and useful Improvements in Nut-Locks, of which the following is a specification.

My present invention relates to nut locks of the type in which the nut is locked upon the bolt, and is designed more particularly as improvements upon the nut lock constituting the subject-matter of my contemporary application, filed April 13, 1918, Ser. No. 228,422.

The object of the present invention is to improve nut locks of the kind stated by the provision of a construction that effects saving in metal, increases the strength of the interlocked portion of the nut and sleeve, permits the inner portion of the sleeve to pass over the bolt so that the nut may be adjusted to any part of the bolt thread, and adapts the sleeve and the coupling member to be expeditiously and easily locked through the medium of a cotter.

Other objects and advantages of the invention will be fully understood from the following description, and claims when the same are read in connection with the drawings, accompanying and forming part of this specification, in which:

Similar numerals of reference designate the corresponding parts in all of the views of the drawings.

Figure 1:
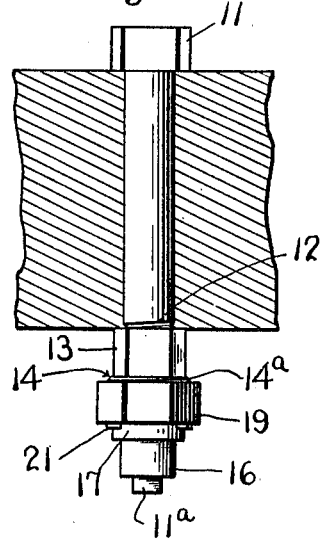
Figure 1 is a side elevation illustrating the best practical embodiment of my invention that I have as yet devised.
Figure 2:
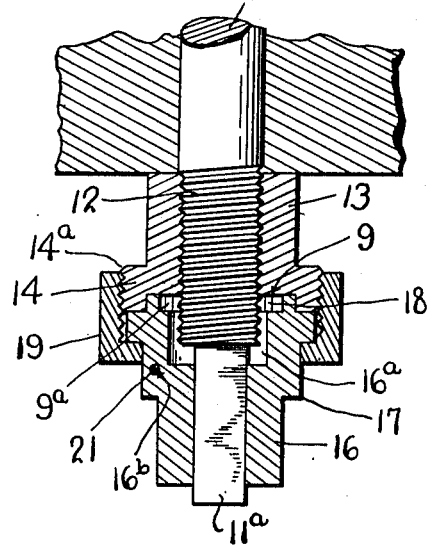
Fig. 2 is a longitudinal section with the bolt in elevation.
Figure 3:
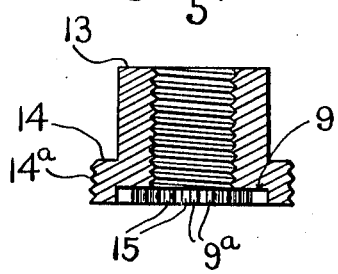
Fig. 3 is an enlarged diametrical section of the nut.
Figure 4:
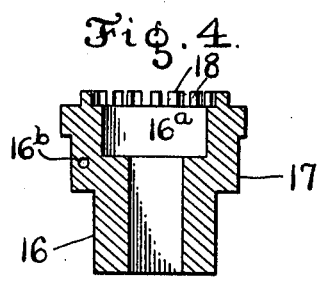
Fig. 4 is a similar view of the sleeve.
Figure 5:
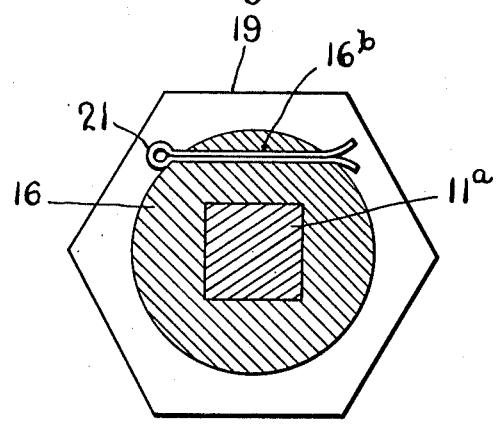
Fig. 5 is an enlarged detail section showing the relative arrangement of the coupling member, the sleeve, and the cotter.

At 11 is shown a bolt, threaded at 12, and having an end portion, of angular form in cross section, the said end portion being numbered 11$^a$. At 13 is the nut, interiorly threaded to engage the bolt, and having an enlargement or flange 14, threaded upon its perimeter as indicated by 14$^a$. In the face of the nut 13 is formed a chamber 9, and located in the said chamber 9 is a plurality of spaced fins 9$^a$ between which are afforded grooves or recesses 15. The fins 9$^a$ are joined at their inner ends and along their outer edges to the nut, and consequently said fins are strongly held in and to the nut. The sleeve 16 is provided with a bore corresponding in cross section to and adapted to snugly receive the end portion 11$^a$ of the bolt. Said sleeve is also provided with an outwardly extending head 17, and projecting from the face of the sleeve is a circular series of spaced ribs or fins 18, adapted to seat in the recesses 15 of the nut. The portion 14 of the nut and the head of the sleeve are of the same diameter. It will also be observed that the sleeve is provided in its inner side or face with a cavity 16$^a$, of a size to receive without engagement the threaded portion of the bolt. This is advantageous because it enables the sleeve to pass over the threaded portion of the bolt to a certain extent and thereby increases the limit within which the nut may be adjustably fixed to the bolt. At 16$^b$ in the sleeve are apertures disposed as shown and designed to receive cotters 21. This provision is advantageous inasmuch as the said apertures are readily accessible and the cotters may be conveniently driven home.

A coupling 19 interiorly threaded as shown is mounted upon the externally threaded end of the nut. The said coupling is provided with a series of apertures 20 adapted to be registered with the apertures in the sleeve in order to receive the cotter. In this way the coupling is effectually held against casual unscrewing or displacement.

In the practical use of my improvement the bolt is inserted through the elements to be connected together, and the nut is turned up upon the threaded portion of the bolt. The sleeve is then moved up upon the angular portion of the bolt and so that its ribs catch into the spaces between the ribs or fins in the nut. The coupling is then positioned as shown so that the flange at its outer end bears against the flange or head of the sleeve, after which one or more cotters are engaged in the sleeve and coupling as shown.

It will be apparent from the foregoing that in addition to the practical advantages ascribed to my improved construction, the apertures in the sleeve for the reception of the cotter pins are materially advantageous inasmuch as said apertures have a fixed location and therefore the coupling may be locked in place irrespective of the position which the nut occupies upon the bolt.

Having described my invention what I claim and desire to secure by Letters-Patent is:—

1. In combination, a bolt threaded and having a reduced end portion, of angular form in cross section, a nut engaged upon the threaded portion of the bolt and having its outer face provided with grooves and its periphery threaded, a sleeve engaged upon the angular end portion of the bolt, ribs on said sleeve engaging within said grooves, and a coupling threaded upon the nut and having a flange engaging against the outer side of the sleeve.

2. In combination, a bolt having a threaded portion and a reduced end portion, of angular form in cross section, a nut engaged upon the threaded portion of said bolt, an enlargement or head on said nut having its periphery threaded and its outer face provided with grooves, a sleeve engaged upon said angular portion of the bolt, an enlargement or head on said sleeve, ribs on the sleeve engaged within the grooves of the nut, and a coupling member threaded upon the periphery of the nut and having an inwardly extending flange bearing against the outer side of the sleeve.

3. The combination in a nut lock, of a bolt having a threaded portion and also having an end portion of angular form in cross section, a nut mounted upon the threaded portion of the bolt, and having a cavity in its face and a circular series of spaced ribs or fins joined along their outer edges and their inner ends to the nut, said nut further having a flange threaded upon its periphery, a sleeve having a bore of angular form in cross section receiving the end portion of the bolt and also having a cavity in its face, and spaced ribs or fins arranged on its face and adapted to enter the recesses between the ribs or fins of the nut, said sleeve also having an aperture for the reception of a cotter, a threaded and flanged coupling engaging the nut and the sleeve and surrounding the latter and having apertures adapted to be registered with the aperture of the sleeve, and a cotter disposed in the said registered apertures.

In testimony whereof I affix my signature.

MARK WILEY.

Copies of this patent may be obtained for five cents each, by addressing the "Commissioner of Patents, Washington, D. C."